Patented Feb. 15, 1938

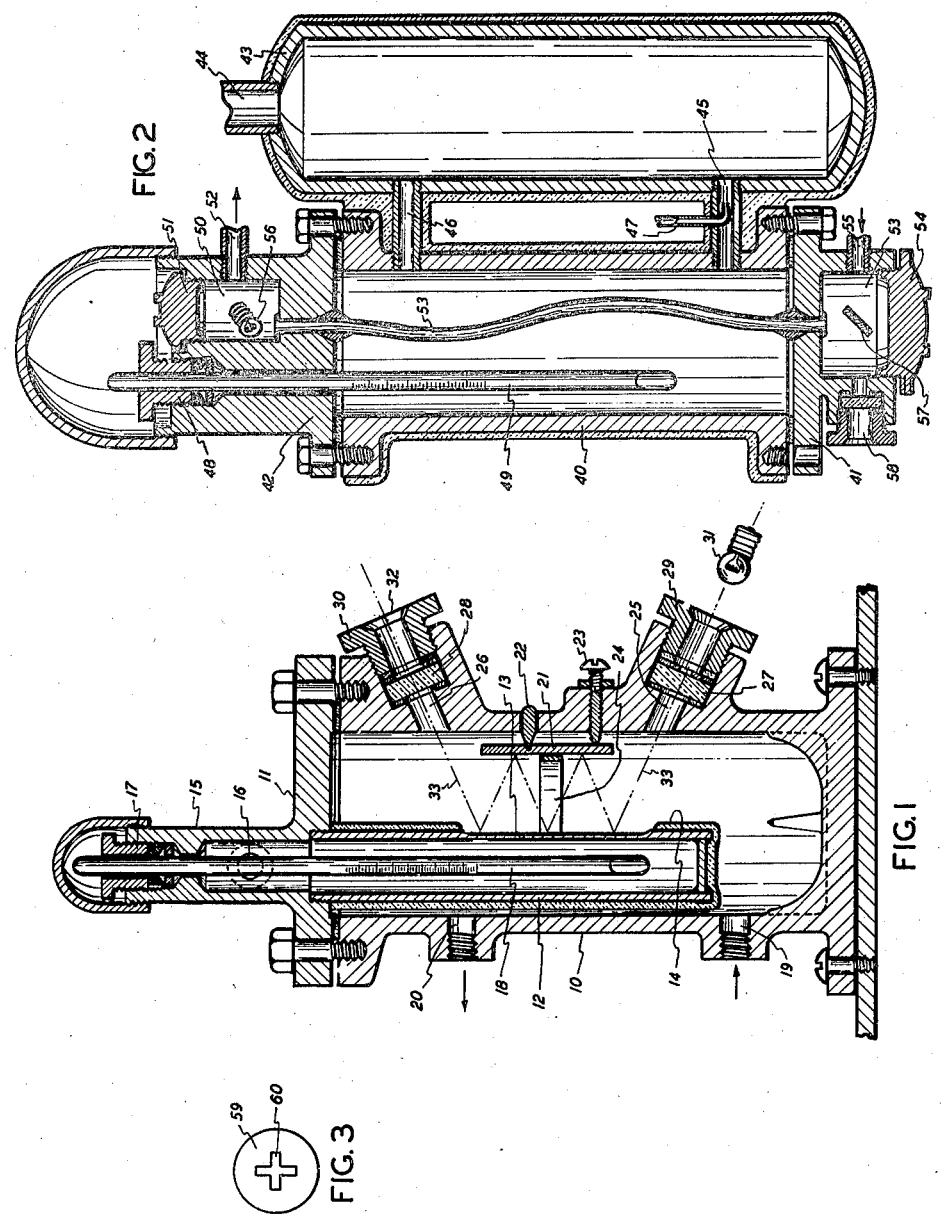

2,108,173

UNITED STATES PATENT OFFICE 2,108,173

APPARATUS FOR DETERMINING DEW POINT OF GASES

Armor B. Martin, Butte, Mont., and Henry N. Wade, Los Angeles, Calif.

Application November 28, 1936, Serial No. 113,270

4 Claims. (Cl. 73—51)

The object of our invention is to provide a means for rapidly and accurately determining the temperature at which a sample of gas becomes supersaturated with water vapor and begins to separate liquid water.

It is well known to determine the dewpoint of a gas by bringing it into contact with a polished and chilled metal surface and observing the temperature at which the surface is dimmed by the collection of water drops thereon. This method is far from satisfactory: first because incipient dew formation is difficult to observe and because the temperature at which dew forms is influenced by the temperature differential between the plate and the gas, both tending to give unduly low readings; second, because it is awkward to apply to gases under pipe line pressure, which is usually the condition under which their dewpoint is of interest.

We have modified the above method in the following respects: first, in confining the gas sample in or passing it slowly through a tube or shell in which it may be maintained at pipe line pressure, at least a portion of the surface contacting the gas being highly polished; second in applying a slow chilling effect to the tube by which its temperature is gradually lowered; third, in directing a light beam against the polished portion of the tube, from which it is reflected to an eyepiece, this beam being extinguished by diffusion as soon as the polished and chilled reflecting surface becomes covered with even the most minute drops of condensed water.

By this method, and in apparatus hereinafter described, determinations of dewpoint may be made with extreme accuracy, in a minimum of time, and under any pressure within the limits fixed by the structure of the apparatus.

It will be evident that this general type of apparatus may be given numerous modifications, but it will suffice to illustrate two of these in the attached drawing and the appended description thereof, in which Fig. 1 illustrates in vertical section an apparatus in which the reflecting surface is formed on the exterior of a tube containing the chilling agent and the sample of gas is retained within a surrounding shell;

Fig. 2 illustrates in the same manner an apparatus in which the reflecting surface is formed on the interior of a tube through which the gas sample is passed and the chilling agent is retained in the surrounding shell, and Fig. 3 illustrates a light-mask which may be used with the apparatus of Fig. 1.

Referring first to Fig. 1, 10 is a cup-shaped container having a cap 11 which is detachable for cleaning and is firmly bolted down. This container must be capable of withstanding the highest pressure at which the dewpoint of a gas is to be determined. Projected downwardly from the head is an inner tube 12 having its lower end closed and being of such thickness as to withstand the external pressure of the gas. This tube, which should be of a hard and noncorrosible metal, is flattened and highly polished at one side for a portion of its length, as at 13, the remaining external surface being protected by heat insulation 14.

The inner tube 12 is open at its upper end but should be provided with a cap 15 having an opening 16 for the introduction of the chilling liquid and the escape of vapor therefrom, and with a gland 17 through which a thermometer 18 may be inserted into this liquid.

The outer container has a pipe-threaded inlet opening 19 and a similar outlet opening 20. These openings would ordinarily be provided with control valves, not shown.

Inside the outer container is placed a mirror 21 arranged in parallel to the flattened reflecting face 13. For adjustment of position this mirror may be provided with a three-point support consisting of the pin 22 and a pair of adjusting screws 23 bearing against the lower corners (only one of these screws being shown) and may be held against these supports by a spring, as for example the expanding ring 24.

Openings 25 and 26 are formed in the wall of the container, both of these openings being directed toward ends of the reflecting surface 13. The openings are closed by thick glass discs 27 and 28 retained by glands 29 and 30, a ring of soft packing being placed on each side of each disc. Finally, a small electric lamp 31 is supported in any convenient manner in the axis of opening 25.

The functioning of this apparatus is as follows: The container is filled with the gas to be tested, under the desired pressure, and preferably a very slow stream of the gas is allowed to flow through it. The inner tube 12 is filled with a volatile liquid boiling below the dewpoint of the gas, as for example a mixture of propane and butane. This mixture cools itself by vaporization at atmospheric pressure and, if the cooling effect is produced too rapidly, a vent valve may be placed in opening 16 by which vaporization may be retarded to any desired extent. The lamp is now lighted and the image of opening 25, a spot of light, becomes visible at point 33 at the end of opening 26, being reflected from the polished surface 13 to the mirror surface 31 and vice versa along the path of the dotted line 33—33. It will be understood that this repeated reflection merely increases the sensitivity of the instrument and that the openings may be so arranged that the light beam is directed against surface 13 and directly reflected to point 32 at which it is observed, the mirror 21 then being unnecessary.

As the temperature of the volatile liquid within the tube 12 is lowered by vaporization, the temperature of the polished surface 13 is simultaneously reduced, the transfer of heat from this surface being rendered very rapid by the ebullition of the liquid within the tube. When a temperature is reached at which the film of gas in immediate contact with the polished surface becomes supersaturated, this surface is clouded by the collection of multitudinous minute drops of water, the light beam passing through opening 26 is diffused, and the image formerly visible through eyepiece 32 disappears. At this point the temperature is read on thermometer 18, this temperature being the dewpoint of the gas at the pressure carried in the shell.

Referring now to Fig. 2, 40 is a cylinder provided with caps 41 and 42 to form a liquid tight shell. A second shell 43 provided with a vent tube 44 is connected at both ends with shell 40 as by tubes 45 and 46. Into the lower tube is passed a small tube 47 terminating in a minute vent for the introduction of a stream of air or gas under pressure to produce circulation of a cooling liquid through the two shells.

The upper cap 42 is provided with an opening and a gland 48 for the insertion of a thermometer 49. It is also provided with a well 50 tightly capped as at 51, this well having a vent 52 which may be provided with a control valve not shown. From the bottom of this well a copper tube 53 passes to a similar well 54 formed in lower cap 41. This tube is rolled or beaded into the caps to form a gas-tight joint adapted to withstand pipeline pressures. The lower well has a closure plug 54 and an inlet opening 55 for the gas to be tested.

The copper tube 53 is wound into a long helix or other form which will prevent any direct rays of light from a lamp 56 placed in the upper well from reaching the mirror 57 placed in the lower well. If the helix be not too sharply curved, however, the mirror will reflect into the eyepiece 58, fixed in the wall of the lower well, a red glow or spot of red light produced by repeated reflections of rays from the lamp against the polished inner wall of the tube.

When a slow stream of the gas to be tested is passed upwardly through tube 53, the two shells being filled with a volatile liquid as described and a circulation of this liquid induced by a stream of air or gas, the wall of the tube is cooled to the temperature of the liquid, and as this temperature is lowered by evaporation of the liquid, it will reach a point at which the gas becomes supersaturated and begins to deposit dew on the inner surface of the gas tube. At this point the internal reflection is destroyed by diffusion of the light rays and the red spot formerly visible in the eyepiece disappears.

The sensitivity of the instrument illustrated in Fig. 1 may be increased by placing next to the glass disc 27 an opaque mask having a perforation of some definite form, as for instance the mask illustrated in Fig. 3 in which the outer portion 59 is opaque while the figure 60 is transparent. This figure or any other having a definite outline is less likely to confuse the eye than a round spot such as corresponds to the unmasked opening, particularly as in this form there is always a certain amount of diffused light so that the spot does not completely disappear at the dewpoint but only becomes dimmed. The broken figure corresponding to the opening in the mask does, however, disappear almost completely, merging in the faintly illuminated ground, giving a sharp indication of the dewpoint.

We claim as our invention:

1. Apparatus for determining the dewpoint of a gas, comprising: a heat conductive wall having a permanent light reflecting surface formed thereon; means for excluding diffused light from said reflecting surface; means for projecting a light beam onto said surface and for visually observing the reflection therefrom; means for contacting said gas with said reflecting surface; means for progressively cooling said wall, and means for determining the momentary temperature of said wall.

2. Apparatus for determining the dewpoint of a gas, comprising: a light source; a metallic tube internally polished and bent to interrupt direct light rays from said source and to transmit reflected light; means for passing said gas through said tube; means for progressively cooling said tube; means for visually observing said reflected light, and means for determining the momentary temperature of said tube.

3. Apparatus for determining the dewpoint of a gas, comprising: a vessel adapted to contain said gas; a permanent light reflecting surface arranged within said vessel; means for excluding diffused light from said surface; means for progressively cooling said reflecting surface; means for determining the momentary temperature of said reflecting surface; means for projecting a light beam against said reflecting surface, and means for observing the reflected light beam.

4. Apparatus for determining the dewpoint of a gas, comprising: a heat-conductive wall having a permanent light reflecting surface formed thereon; means for projecting a light beam onto said surface; means for causing said light beam to be repeatedly reflected from said surface; means for contacting said gas with said reflecting surface; means for progressively cooling said wall; means for determining the momentary temperature of said wall, and means for observing a change in the intensity of said repeatedly reflected light beam.

ARMOR B. MARTIN.
HENRY N. WADE.